(12) United States Patent
Kim (10) Patent No.: US 7,174,244 B2
(45) Date of Patent: Feb. 6, 2007

(54) SUSPENSION OF A VEHICLE AND METHOD FOR CONTROLLING THE SAME

(75) Inventor: Jeong Hoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 429 days.

(21) Appl. No.: 10/750,683

(22) Filed: Dec. 31, 2003

(65) Prior Publication Data

US 2005/0038584 A1 Feb. 17, 2005

(30) Foreign Application Priority Data

Aug. 13, 2003 (KR) .................. 10-2003-0056189

(51) Int. Cl.
B60G 17/15 (2006.01)
G06F 17/00 (2006.01)
(52) U.S. Cl. ............... 701/37; 188/266; 188/266.1; 248/550; 248/556; 248/560; 248/562
(58) Field of Classification Search .............. 701/37; 188/266; 248/550, 556, 560, 562
See application file for complete search history.

(56) References Cited

U.S. PATENT DOCUMENTS

| 5,269,557 | A | * | 12/1993 | Butsuen et al. ........... 280/5.515 |
| 5,434,782 | A | * | 7/1995 | Henry ........................ 701/37 |
| 5,526,609 | A | * | 6/1996 | Lee et al. ...................... 52/1 |
| 5,536,059 | A | * | 7/1996 | Amirouche ............... 296/65.02 |
| 5,765,313 | A | * | 6/1998 | Lee et al. ...................... 52/1 |
| 6,077,302 | A | * | 6/2000 | Kumra et al. ................. 703/7 |
| 6,170,202 | B1 | * | 1/2001 | Davoodi et al. ........... 52/167.1 |
| 2005/0038584 | A1 | * | 2/2005 | Kim .......................... 701/37 |

FOREIGN PATENT DOCUMENTS

| CN | 1579823 A | * | 2/2005 |
| DE | 10019763 | | 11/2000 |
| DE | 10361377 A1 | * | 3/2005 |
| EP | 0949496 | | 10/1999 |
| JP | 5-505369 | | 8/1993 |
| JP | 07-228114 | | 8/1995 |
| JP | 11-502486 | | 3/1999 |
| JP | 11-115442 | | 4/1999 |
| JP | 2002-248921 | | 9/2002 |
| JP | 2005059835 A | * | 3/2005 |
| WO | WO 96/14220 | | 5/1996 |

OTHER PUBLICATIONS

Kondo Kyouhei, "Engineering Basic Vibration Theory" Japan: *Baifukan Ltd.* pp. 98-101, May 30, 1993 (English Translation).
Automobile Technology Handbook, Book 1; Basic Theory; Japan: *Automobile Technology Edition* pp. 247-248, Jun. 15, 1992 (English Translation).

* cited by examiner

*Primary Examiner*—Cuong Nguyen
(74) *Attorney, Agent, or Firm*—Morgan Lewis & Bockius LLP (57) ABSTRACT

A vehicle suspension system is designed such that its equation of motion can be decoupled. Such a suspension system is provided with actuators, and the actuators are optimally controlled to reduce vibration of the suspension system.

11 Claims, 4 Drawing Sheets

(Dynamic model for non-coupled modal equations)

Fig. 3

(Dynamic model for a sky-hook modal damper control system)

(Dynamic model for a sky-hook coulomb modal friction damper control system)

Fig. 6

SUSPENSION OF A VEHICLE AND METHOD FOR CONTROLLING THE SAME

CROSS-REFERENCE TO RELATED APPLICATIONS

This application claims priority of Korean Application No. 10-2003-0056189, filed on Aug. 13, 2003, the disclosure of which is incorporated fully herein by reference.

FIELD OF THE INVENTION

Generally, the present invention relates to a vehicle. More particularly, the present invention relates to a suspension of a vehicle and a method for controlling the same.

BACKGROUND OF THE INVENTION

A suspension of a vehicle responds to various road impacts encountered while the vehicle is being driven, and controls dynamics of the vehicle under acceleration/deceleration and turns. One important role of such a suspension is to reduce transmission of noise and vibration into a vehicle body.

In a typical suspension of a vehicle, a spring and a damper (also called a shock absorber) is mounted to each wheel. A spring coefficient (also called a spring rate or a spring constant) of the spring, a damping coefficient of the damper, and mounting positions of the springs and dampers are determined in the designing process of the suspension. Therefore, a great deal of research has been undertaken to enhance performance of a suspension by efficiently determining such design factors.

However, the amount of possible enhancement of the performance of a suspension by simply changing such design factors is limited. So recently, new research has been undertaken to actively eliminate vibration of the suspension by utilizing a plurality of excitation actuators mounted to a suspension system. Such excitation actuators may be disposed with each spring/damper for each wheel.

For example, through a process called direct velocity feedback control, vibration energy may be dissipated by increasing the damping effect in a vehicle suspension system that has multiple degrees of freedom. Such a technique shows a merit in that asymptotic stability is ensured.

However, in order to obtain asymptotic stability by such direct velocity feedback control, many sensors and excitation actuators are required. This is problematic because equations of motion of a suspension become inter-coupled when modeling the vehicle suspension by equations of motion.

Therefore, recently, research has been undertaken to design a suspension such that the equations of motion thereof become non-coupled, or to determine what actuating forces should be applied to such a designed suspension.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An exemplary method for designing a vehicle suspension system according to a embodiment of the present invention includes: formalizing the vehicle suspension system in accordance with a preferred equation of motion. Such an equation is preferably a linear matrix equation having n degrees of freedom (where n is greater than 1) and including a damping matrix for a viscous damping. Eigenvectors of a stiffness matrix K for the equation are calculated. The eigenvectors are normalized with respect to a mass matrix M. A similarity transform matrix S is calculated consisting of the normalized eigenvectors. The equation of motion is then normalized using the similarity transform matrix S. According to such a design process, a suspension system designed as such has its equation of motion adaptable for mode normalization.

In a preferred embodiment of the invention the preferred equation of motion is:

$$M\ddot{x}(t)+C(\dot{x}(t)-\dot{u}(t))+K(x(t)-u(t))=Pf(t). \quad (1)$$

Here, n and p respectively denote the degrees of freedom of the suspension system and the number of independent actuators.

M, C, and K respectively denote a mass matrix, a damping matrix, and a stiffness matrix, each of which is symmetrically n×n. The mass matrix M is a positive definite matrix, the damping matrix C is a positive semi-definite matrix, and the stiffness matrix K is a positive definite matrix.

P denotes an n×p real matrix corresponding to positions of the actuators.

x(t) and u(t) respectively denote n×1 state and disturbance vectors, and f(t) denotes a p×1 external force (i.e., an actuating force) vector.

In a further embodiment, the normalizing of equation 1 establishes a proportional relationship $k_j=\alpha \times c_j$ between each pair of a spring coefficient $k_j$ of a j-th spring and a damping coefficient $c_j$ of a j-th damper corresponding to the j-th spring.

An exemplary vehicle suspension system according to an embodiment of the present invention includes: a plurality of springs; a plurality of dampers each corresponding to one of the springs; and a plurality p of actuators for generating control force to the suspension system. The suspension system is formalized by the above equation 1, and equation 1 is decoupled into n modal equations, wherein equation 1 is a linear matrix equation having a number, n, of degrees of freedom, and the linear matrix equation includes a damping matrix for viscous damping.

In the same way as described above, in a further embodiment, a proportional relationship $k_j=\alpha \times c_j$ is satisfied between each pair of a spring coefficient $k_j$ of a j-th spring and a damping coefficient $c_j$ of a j-th damper corresponding to the j-th spring.

When the number n and the number p are equal, it is preferable that the suspension system further includes: a detecting unit for detecting at least one of the state vector x(t) and its velocity $\dot{x}(t)$; and a controller for controlling the actuators on the basis of the detected at least one of the state vector x(t) or its velocity $\dot{x}(t)$. Here, the controller controls the actuators by an actuating force of $f=Q^{-1}\hat{f}$, wherein:

$Q=S^T P$, $\hat{f}_i=-C_{Si}\dot{\xi}_i$, and $x(t)=S\xi(t)$ are satisfied.

$C_{Si}$ is a damping coefficient of a sky-hook damper connected to an i-th mode. S is a matrix consisting of eigenvectors of the stiffness matrix K and is normalized with respect to the mass matrix M.

When the number p is less than the number n, it is preferable the suspension system further includes: a detecting unit for detecting at least one of the state vector x(t) and its velocity $\dot{x}(t)$; and a controller for controlling the actuators on the basis of the detected one of the state vector x(t) or its velocity $\dot{x}(t)$, wherein the controller controls the actuators by an actuating force of f(t) that satisfies $$\hat{f}_i = -F_{Si}\text{sign}(\dot{\xi}_i) = \sum_{j=1}^{p} Q_{ij} f_j.$$

Here, $Q=S^T P$ and $x(t)=S\xi(t)$ are satisfied. $F_{Si}$ is a frictional force of a sky-hook coulomb friction damper connected to an i-th mode. S is a matrix consisting of eigenvectors of the stiffness matrix K and is normalized with respect to the mass matrix M.

In more detail, the actuating force f(t) preferably satisfies $$\begin{cases} \text{if} Q_{1j}\text{sign}(\dot{\xi}_1) \geq & \cdots & Q_{nj}\text{sign}(\dot{\xi}_n) \geq 0, \quad f_j = -F_A \\ 0 \ \& Q_{2j}\text{sign}(\dot{\xi}_2) \geq 0 \ \& \\ \text{if} Q_{1j}\text{sign}(\dot{\xi}_1) \geq & \cdots & Q_{nj}\text{sign}(\dot{\xi}_n) < 0, \quad f_j = -F_1 \\ 0 \ \& Q_{2j}\text{sign}(\dot{\xi}_2) \geq 0 \ \& \\ & \vdots & \\ \text{if} Q_{1j}\text{sign}(\dot{\xi}_1) < & \cdots & Q_{nj}\text{sign}(\dot{\xi}_n) \geq 0, \quad f_j = -F_{(2^n-2)} \\ 0 \ \& Q_{2j}\text{sign}(\dot{\xi}_2) < 0 \ \& \\ \text{if} Q_{1j}\text{sign}(\dot{\xi}_1) < & \cdots & Q_{nj}\text{sign}(\dot{\xi}_n) < 0, \quad f_j = -F_B \\ 0 \ \& Q_{2j}\text{sign}(\dot{\xi}_2) < 0 \ \& \end{cases}$$

with respect to $i = 1, \ldots, n$ and $j = 1, \ldots, p$.

Here, $F_A$ is a value in a range of zero (0) to $F_P$; $F_B$ is a value in a range of zero (0) to $F_N$; $F_k$ for $k=1, \ldots, (2^n-2)$ is a value between $F_P$ and $F_N$; and $F_P$ and $F_N$ respectively denote a positive maximum force and a negative maximum force that a j-th actuator can generate.

In further detail, the actuating force f(t) preferably satisfies $$\begin{cases} \text{if } Q_{ij}\text{sign}(\dot{\xi}_i) \geq 0 & \text{for } i = 1, \ldots, n, \quad f_j = -F_A \\ \text{if } Q_{ij}\text{sign}(\dot{\xi}_i) < 0 & \text{for } i = 1, \ldots, n, \quad f_j = -F_B \\ \text{Otherwise,} & f_j = 0 \end{cases}$$

with respect to $i = 1, \ldots, n$ and $j = 1, \ldots, p$.

It is further preferable that values of $F_A$ and $F_P$ are equal, and that values of $F_B$ and $F_N$ are equal.

A vehicle suspension system controlled by an exemplary method of the present invention includes a plurality of dampers and a plurality of actuators, is formalized by the above-mentioned equation (1), and is transformed to a second decoupled equation.

An exemplary method for controlling such a vehicle suspension system includes: calculating a velocity vector $\dot{x}(t)$ of a state vector $x(t)$ of the above mentioned equation (1); calculating an actuating force f(t) such that the actuating force f(t) satisfies $f(t)=(S^T P)^{-1}(-C_{Si})(S^T KS)^{-1}(S^T K)\dot{x}(t)$, the $C_{Si}$ being a damping coefficient of a sky-hook damper connected to an i-th mode; and actuating the actuators by the calculated actuating force f(t).

In a further preferred embodiment of the invention, the second decoupled equation is:

$$I\ddot{\xi}(t)+\text{diag}[2\zeta_i\omega_i](\dot{\xi}(t)-\dot{\eta}(t))+\Lambda_K(\xi(t)-\eta(t))=\hat{f}(t). \quad (2)$$

Here, I is an n×n unit matrix. S is a matrix consisting of eigenvectors of the stiffness matrix K and is normalized with respect to the mass matrix M.

$Q=S^T P$, $\hat{f}=Qf(t)$, $x(t)=S\xi(t)$, $u(t)=S\eta(t)$, $S^T KS=\text{diag}[\omega_i^2]=\Lambda_K$, and $S^T CS=\hat{C}=\text{diag}[2\zeta_i\omega_i]$ are satisfied by the matrix S.

An exemplary method for controlling such a suspension system may include: calculating a velocity vector $\dot{x}(t)$ of a state vector $x(t)$ of an equation (1); calculating an actuating force f(t) such that the actuating force f(t) satisfies $$\begin{cases} \text{if} Q_{1j}\text{sign}(\dot{\xi}_1) \geq & \cdots & Q_{nj}\text{sign}(\dot{\xi}_n) \geq 0, \quad f_j = -F_A \\ 0 \ \& Q_{2j}\text{sign}(\dot{\xi}_2) \geq 0 \ \& \\ \text{if} Q_{1j}\text{sign}(\dot{\xi}_1) \geq & \cdots & Q_{nj}\text{sign}(\dot{\xi}_n) < 0, \quad f_j = -F_1 \\ 0 \ \& Q_{2j}\text{sign}(\dot{\xi}_2) \geq 0 \ \& \\ & \vdots & \\ \text{if} Q_{1j}\text{sign}(\dot{\xi}_1) < & \cdots & Q_{nj}\text{sign}(\dot{\xi}_n) \geq 0, \quad f_j = -F_{(2^n-2)} \\ 0 \ \& Q_{2j}\text{sign}(\dot{\xi}_2) < 0 \ \& \\ \text{if} Q_{1j}\text{sign}(\dot{\xi}_1) < & \cdots & Q_{nj}\text{sign}(\dot{\xi}_n) < 0, \quad f_j = -F_B \\ 0 \ \& Q_{2j}\text{sign}(\dot{\xi}_2) < 0 \ \& \end{cases}$$

with respect to $i = 1, \ldots, n$ and $j = 1, \ldots, p$; and actuating the actuators by the calculated actuating force f(t).

Here, $F_A$ is a value in a range of zero (0) to $F_P$; $F_B$ is a value in a range of zero (0) to $F_N$; $F_k$ for $k=1, \ldots, (2^n-2)$ is a value between $F_P$ and $F_N$; and $F_P$ and $F_N$ respectively denote a positive maximum force and a negative maximum force that a j-th actuator can generate.

It is preferable that the actuating force f(t) satisfies $$\begin{cases} \text{if } Q_{ij}\text{sign}(\dot{\xi}_i) \geq 0 & \text{for } i = 1, \ldots, n, \quad f_j = -F_A \\ \text{if } Q_{ij}\text{sign}(\dot{\xi}_i) < 0 & \text{for } i = 1, \ldots, n, \quad f_j = -F_B \\ \text{Otherwise,} & f_j = 0 \end{cases}$$

with respect to $i = 1, \ldots, n$ and $j = 1, \ldots, p$.

It is further preferable that values of $F_A$ and $F_P$ are equal, and values of $F_B$ and $F_N$ are equal.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
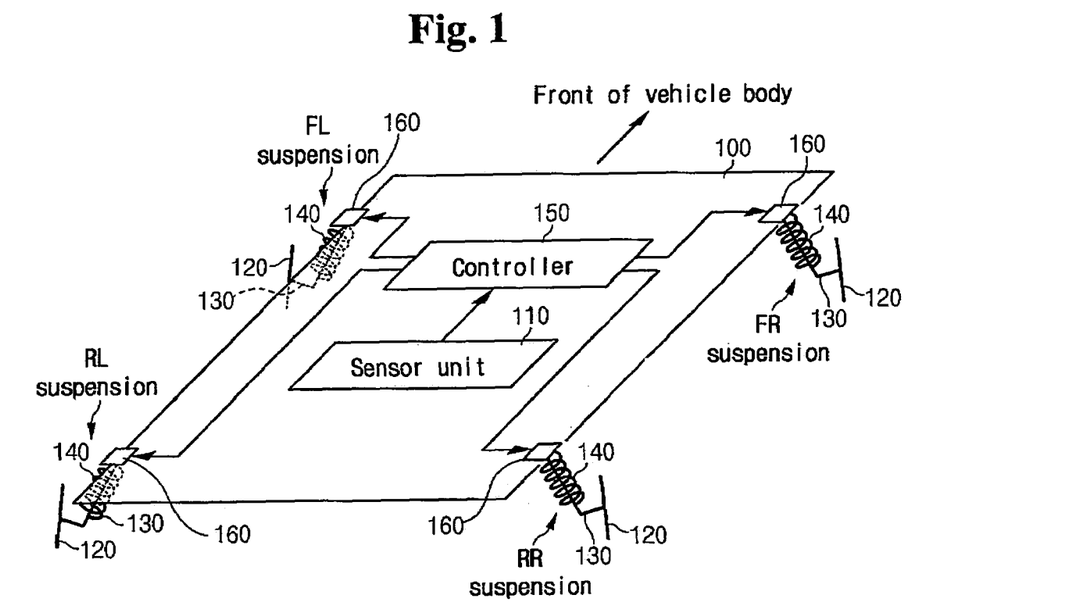
FIG. 1 is a block diagram of a vehicle suspension system according to an embodiment of the present invention.

The present invention may be applied to a vehicle regardless of its number of wheels (and consequently its number of springs and dampers). However, for illustrational purposes, FIG. 1 shows a vehicle suspension system in which four wheels 120 are included and a corresponding number of springs 140 and dampers 130 are mounted to a vehicle body 100.

A sensor unit 110 is mounted to the vehicle body 100 so as to measure motion parameters of the vehicle body 100.

A motion parameter includes each element in a state vector $x(t)$ (preferably, its time derivative $\dot{x}(t)$) by which an equation of motion of the vehicle body is established. The elements of the state vector $x(t)$ may be preset in various manners according to analysis techniques of rigid body motion. As a preferred example, the elements of the state vector $x(t)$ include six parameters for translational and rotational motion of the vehicle body 100. The order of the state vector measured by the sensor unit 110 relates to degrees of freedom in simultaneous equations of motion of the vehicle suspension system.

A vehicle suspension system of an embodiment of the present invention includes front-left (FL), front-right (FR), rear-left (RL), and rear-right (RR) suspensions.

An actuator 160 is mounted to each of the FL, FR, RL, and RR suspensions so as to generate and apply activating force to a corresponding suspension. FIG. 1 shows four actuators 140, however, the number of the actuators is not required to be equal to the number of the wheels 120.

A method for designing a vehicle suspension system of a present embodiment and a suspension system of a present embodiment are hereinafter described in more detail. For the purpose of better understanding the wide scope of possible applications of the spirit of the present invention, the number of degrees of freedom in an equation of motion of the suspension system is denoted by n, and the number of independent actuators is denoted by p.

An equation of motion of vehicle body 100 according to a linear suspension system showing viscous damping may be written as the following equation (1).

$$M\ddot{x}(t)+C(\dot{x}(t)-\dot{u}(t))+K(x(t)-u(t))=Pf(t) \quad (1)$$

Here, M, C, and K respectively denote a mass matrix, a damping matrix, and a stiffness matrix, each of which is symmetrically n×n. The mass matrix M is a positive definite matrix, the damping matrix C is a positive semi-definite matrix, and the stiffness matrix K is a positive definite matrix.

The P denotes an n×p real matrix corresponding to positions of the actuators, and the f(t) denotes a p×1 external force (i.e., actuating force generated by the actuator 160) vector.

$x(t)$ and $u(t)$ respectively denote n×1 state and disturbance vectors. $u(t)$ implies disturbance caused while the wheel 120 moves along a road surface.

Driving an equation of motion for a given suspension system in the form of the above equation 1 is within the capability of a person of ordinary skill in the art. In addition, given specific values of the matrices M, C, K, and P of equation (1), extracting physical features of the suspension system corresponding to equation (1) is also within the capability of a person of ordinary skill in the art.

A decoupling process of equation (1) is firstly described hereinafter.

A matrix S that satisfies the following equation (2) can be obtained by obtaining eigenvectors of the stiffness matrix K, and subsequently normalizing the eigenvector with respect to the mass matrix M.

$$S^T M S = I \text{ and } S^T K S = \text{diag}[\omega_i^2] \quad (2)$$

Here, $\text{diag}[\omega_i^2]$ denotes a diagonal matrix whose (i,i) element is $\omega_i^2$ and I denotes an n×n unit matrix. Hereinafter, $\Lambda_K$ is defined as $S^T KS$ (i.e., $\Lambda_K \equiv S^T KS$).

$\omega_i^2$, being a square of a natural frequency $\omega$, is an i-th eigenvalue of the stiffness matrix K.

Equation (2) defines an orthonormality of the matrix S. Equation (2) implies that, according to a similarity transform by a similarity transform matrix S, the mass matrix M may be transformed to a unit matrix, and the stiffness matrix K may be transformed to a diagonal matrix.

According to the similarity transform by the similarity transform matrix S, a similar matrix $\hat{C}$ (called a modal damping matrix hereinafter) of the damping matrix C can be obtained as the following equation (3):

$$S^T CS = \hat{C} \quad (3)$$

The modal damping matrix $\hat{C}$ is an n×n symmetric positive semi-definite matrix, and is not necessarily a diagonal matrix.

By multiplying the similarity transform matrix S to the left of equation (1), and by substitutions of $x(t)=S\xi(t)$ and $u(t)=S\eta(t)$ equation (1) is converted into the following equation (4):

$$(S^T MS)\ddot{\xi}(t)+(S^T CS)(\dot{\xi}(t)-\dot{\eta}(t))+(S^T KS)(\xi(t)-\eta(t))-\eta(t)=S^T Pf(t) \quad (4)$$

Therefore, if the modal damping matrix $S^T CS=\hat{C}$ can be diagonalized, the left side of equation (4) becomes a diagonalized matrix equation, i.e., modal equations, by a similarity transform.

Such a modal damping matrix $\hat{C}$ can be diagonalized in various manners. As an example, a condition of the following equation (5) may be imposed to the suspension system:

$$k_j \propto c_j (j=1, \ldots, \text{number of springs}) \quad (5)$$

Here, $\alpha$ is a constant, and $k_j$ and $c_j$ respectively denote a j-th spring coefficient (or equivalently, spring rate) and a j-th damping coefficient.

For a vehicle suspension system, a spring for controlling motion of the vehicle body and a damper for damping a vibration of the spring are usually mounted at a same position. Therefore, the stiffness matrix K and the damping matrix C show same values related to positions, although spring coefficients and damping coefficients thereof may be different.

Therefore, equation (5) implies that a vehicle suspension system is designed such that $k_j = \alpha \times c_j$ is satisfied for every $j=1, \ldots$, number of springs. That is, a ratio of spring and damping coefficients of a spring and a damper is the same regardless of the position (such as FL, FR, RL, and RR) of the suspension.

According to the condition of equation (5), the modal damping matrix $\hat{C}$ can be diagonalized, in the same way as the similar matrix $\Lambda_K \equiv S^T KS$ of the stiffness matrix K. The modal damping matrix $\hat{C}$ diagonalized as such can be written as the following equation (6):

$$S^T CS = \hat{C} = \text{diag}[2\zeta_i \omega_i] \quad (6)$$

Here, $\zeta_i$ denotes an i-th modal damping ratio.

Rewriting equation 1 (or equation 4) under the condition of equation 5, the following equation (7) can be derived:

$$I\ddot{\xi}(t) + \text{diag}[2\zeta_i \omega_i](\dot{\xi}(t) - \dot{\eta}(t)) + \Lambda_K(\xi(t) - \eta(t)) = \hat{f}(t) \quad (7)$$

Here, $\hat{f} = Qf(t)$ and $Q = S^T P$. Regarding x(t) and u(t), x(t)=$S\xi(t)$ and $u(t) = S\eta(t)$.

As is clear from equation (7), the left side of the equation of motion of a vehicle suspension system is fully diagonalized.

Therefore, n (i=1, . . . ,n) modal equations can be derived from the above equation (7) in a form of the following equation (8).

$$\ddot{\xi}_i(t) + 2\zeta_i \omega_i (\dot{\xi}_j(t) - \dot{\eta}_j(t)) + \omega_i^2 (\xi_i(t) - \eta_i(t)) = \hat{f}_i(t) \quad (8)$$

$$= \sum_{j=1}^{p} Q_{ij} f_j(t)$$

Figure 2:
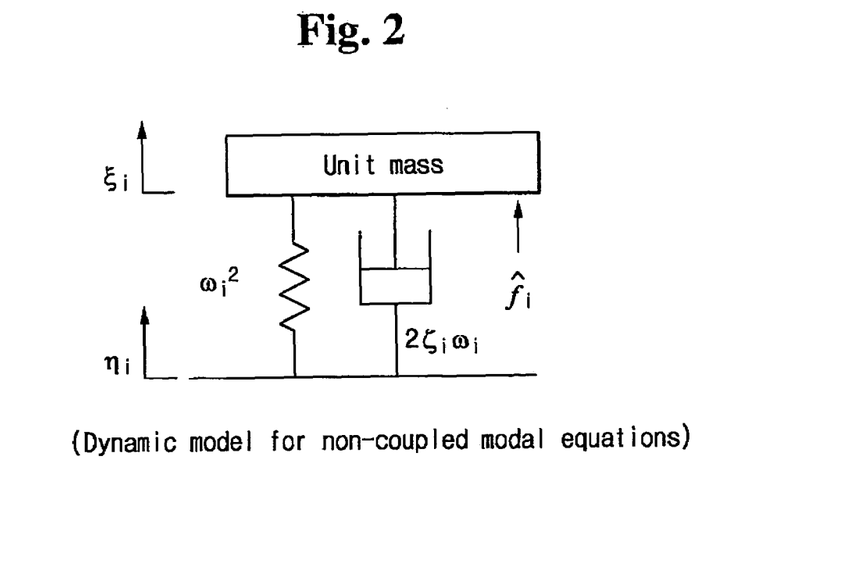
FIG. 2 illustrates an exemplary dynamic model for decoupled modal equations.

For reference, an exemplary dynamic model for decoupled modal equations is illustrated in FIG. 2.

As can be seen from equation (8), the equation of motion of a suspension system is fully decoupled except for the right side which relates to forced activation. And now, the suspension system becomes convenient for designing an actuating force of the actuators 160 for vibration control, and/or applying the designed actuating force to the suspension system.

The above described method for designing a suspension system can be summarized as: formalizing the vehicle suspension system by equation (1); calculating eigenvectors of a stiffness matrix K of equation (1); normalizing the eigenvectors with respect to a mass matrix M of equation (1); calculating a similarity transform matrix S consisting of the normalized eigenvectors; and normalizing equation (1) using the similarity transform matrix S.

According to such a method for designing a vehicle suspension system, an equation of motion of a suspension system is mode normalized at the stage of designing. Therefore, dynamic behavior characteristics of such a suspension system can be easily enhanced by better control logic which can be obtained by an analysis study of a vehicle dynamics.

Determining active damping of suspension motion embodiments for when and how large an actuating force should be generated by the actuators 160 is now described in detail, with respect to cases of different numbers of activators.

In order for active damping of the suspension motion to occur, a suspension system of a present embodiment further includes, as shown in FIG. 1, a controller 150 for receiving signals from the sensor unit 110 and accordingly for controlling the actuators 160 on the basis thereof.

The controller 150 can be realized by one or more processors activated by predetermined software, and the predetermined software can be programmed to perform each step of a method according to a preferred embodiment of this invention.

Hereinafter, a first embodiment is described with respect to a case in which the actuators 160 are provided in a same number n of the modal equations (i.e., modes), and a second embodiment is described with respect to a case in which the number p of the actuators 160 is less than the number n of the modes.

Figure 3:
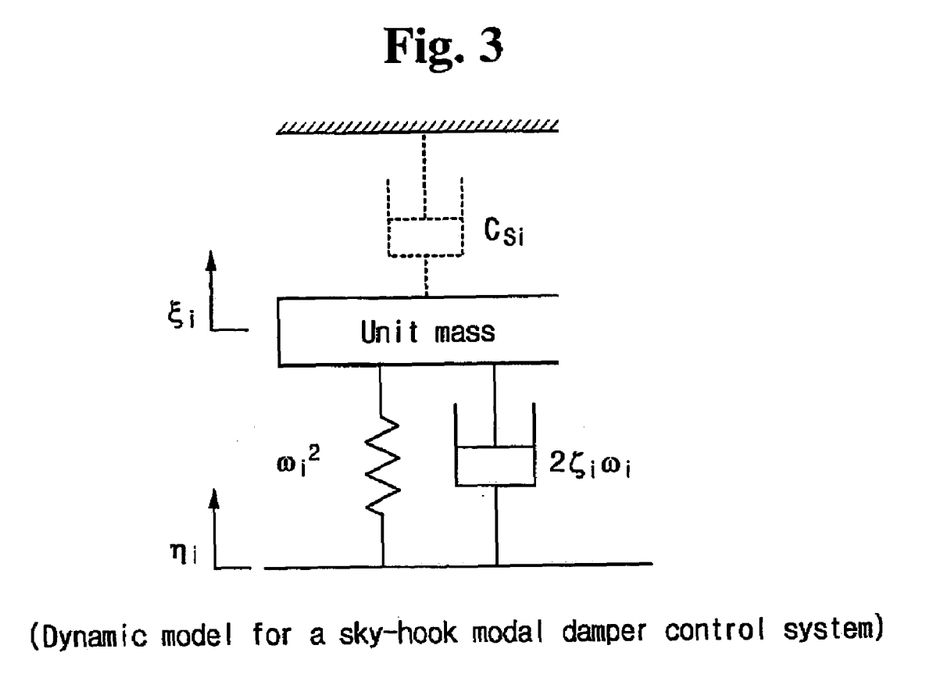
FIG. 3 illustrates an exemplary dynamic model for a vehicle suspension system including a sky-hook modal damper that satisfies non-coupled modal equations according to an embodiment of the present invention.

Firstly, the former case is described in detail. In this case, the number p of the actuators 160 is equal to the number n of modes. In this case, a sky-hook modal damper is preferably adopted as a damper for active damping. An exemplary dynamic model for a vehicle suspension system including a sky-hook modal damper that satisfies non-coupled modal equations is illustrated in FIG. 3.

Whereas a conventional viscous damping damper forms damping force proportional to relative speed between a vibrating mass (i.e., vehicle body) and a supporting plane (i.e., road surface), the sky-hook damper forms a damping force proportional to an absolute velocity of the mass (i.e., regardless of undulation of the road surface).

Therefore, an active damping force (i.e., a modal control force) $\hat{f}_i$ designed to such a sky-hook damper may be expressed as the following equation (9):

$$\hat{f}_i = -C_{Si} \dot{\xi}_i \quad (9)$$

Here, $C_{Si}$ is a damping coefficient of a sky-hook damper connected to an i-th mode, and $\dot{\xi}_i$ is an absolute velocity of the i-th mode.

When the number p of the actuators 160 equals the number n of the modes (n=p), the matrix Q is a regular matrix (or a non-singular matrix) that is invertible, and therefore, the actuating force f can be written as the following equation (10):

$$f = Q^{-1} \hat{f} \quad (10)$$

Using the above equation (10), the equation of motion of the suspension system can be converted to the following equation (11):

$$\ddot{\xi}_i(t) + (2\zeta_i \omega_i + C_{Si}) \dot{\xi}_i(t) + \omega_i^2 \xi_i(t) = \hat{C}_{ii} \dot{\eta}_i(t) + \omega_i^2 \eta_i(t) \quad (11)$$

As can be seen from equation (11), the equation of motion of a suspension system is fully decoupled. Therefore, when an actuating force of equation (10) is applied to the actuators 160, a modal vibration in each mode of the equation of motion of the suspension system can be easily diminished.

The controller 150 can apply the actuating force of equation (10) to the actuators 160 in the process described hereinafter.

Figure 4:
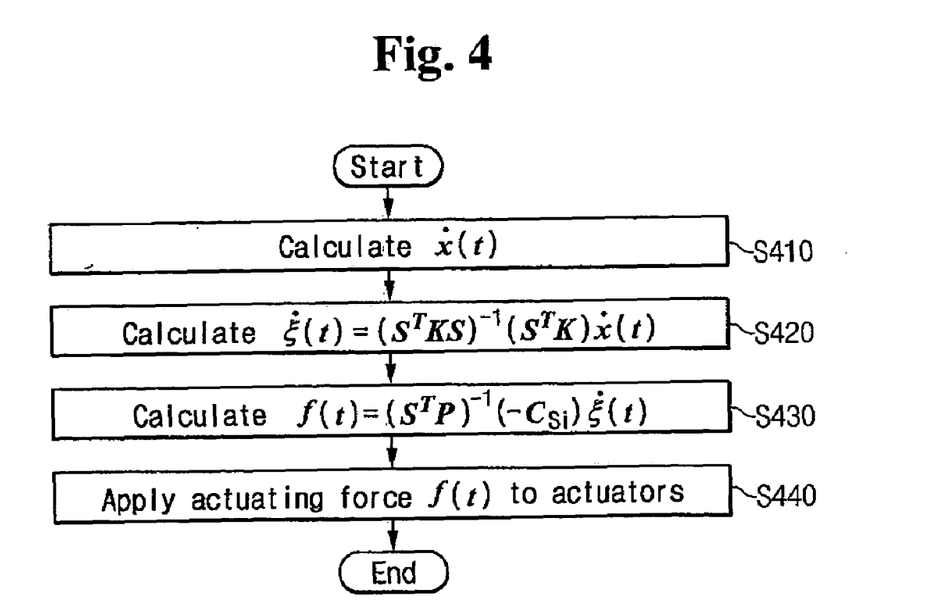
FIG. 4 is a flowchart showing a method for controlling a vehicle suspension system, performed by a controller when a number n of degrees of freedom of equations of motion of the suspension system equals a number p of actuators, according to an embodiment of the present invention.

As shown in FIG. 4, firstly at step S410, the controller 150 calculates the time derivative (i.e., velocity) $\dot{x}(t)$ of the state vector x(t) on the basis of signals from the sensor unit 110.

Subsequently at step S420, the controller 150 calculates a velocity $\dot{\xi}(t)$ of a modal state vector $\xi(t)$ on the basis of the velocity $\dot{x}(t)$ of the state vector x(t). The velocity $\dot{\xi}(t)$ of the modal state vector $\xi(t)$ is calculated by $x(t) = S\xi(t)$ using the similarity transform matrix S and the stiffness matrix K, which is predetermined at a stage of designing the suspension system. In more detail, the velocity $\dot{\xi}(t)$ of the modal state vector $\xi(t)$ is calculated as a value according to $\dot{\xi}(t) = (S^T KS)^{-1} (S^T K) \dot{x}(t)$.

Subsequently at step S430, the controller 150 calculates an actuating force vector f(t) for the actuators 160 using the velocity $\dot{\xi}(t)$ of the modal state vector $\xi(t)$.

In more detail, the actuating force vector f(t) is calculated by an equation $f(t) = (S^T P)^{-1}(-C_{Si}) \dot{\xi}(t)$ equivalent to equation (10) using the similarity transform matrix S and the matrix P corresponding to positions of the actuators 160, which is predetermined at a stage of designing the suspension system. The actuating force vector f(t) calculated as such is calculated as a value according to $f(t)=(S^T P)^{-1}(-C_{Si})(S^T KS)^{-1}(S^T K)\dot{x}(t)$.

Subsequently at step S440, the controller 150 applies such calculated actuating force vector f(t) to the actuators 160.

Regarding the above description, the following remarks are notable.

Firstly, it is not necessarily required that the sensor unit 110 detects the state vector x(t) and the controller 150 calculates its velocity $\dot{x}(t)$. As a modified embodiment, the sensor unit 110 may directly detect the velocity $\dot{x}(t)$ of the state vector x(t) such that the controller 150 can simply receive the detected velocity $\dot{x}(t)$. Therefore, in the detailed description of the embodiment of the present invention and in the appended claims, the calculation of the velocity $\dot{x}(t)$ of the state vector x(t) should be understood to cover any step for obtaining the value of the velocity $\dot{x}(t)$ of the state vector x(t).

In addition, a process for calculating the actuating force vector f(t) has been described with reference to a plurality of steps in the above description, however it should be understood to be an exemplary process to finally calculate a value of $f(t)=(S^T P)^{-1}(-C_{Si})(S^T KS)^{-1}(S^T K)\dot{x}(t)$. As a simple variation, having stored a value of $(S^T P)^{-1}(-C_{Si})(S^T KS)^{-1}(S^T K)$ in the controller 150, the controller 150 may obtain the actuating force vector f(t) by simply multiplying the stored matrix $(S^T P)^{-1}(-C_{Si})(S^T KS)^{-1}(S^T K)$ by the velocity vector $\dot{x}(t)$ after the step S410.

A suspension system according to a second embodiment of the present invention is hereinafter described in detail.

According to a second embodiment, the number p of the actuators 160 is less than the number n of modes (or equivalently, the number of modal equations).

Figure 5:
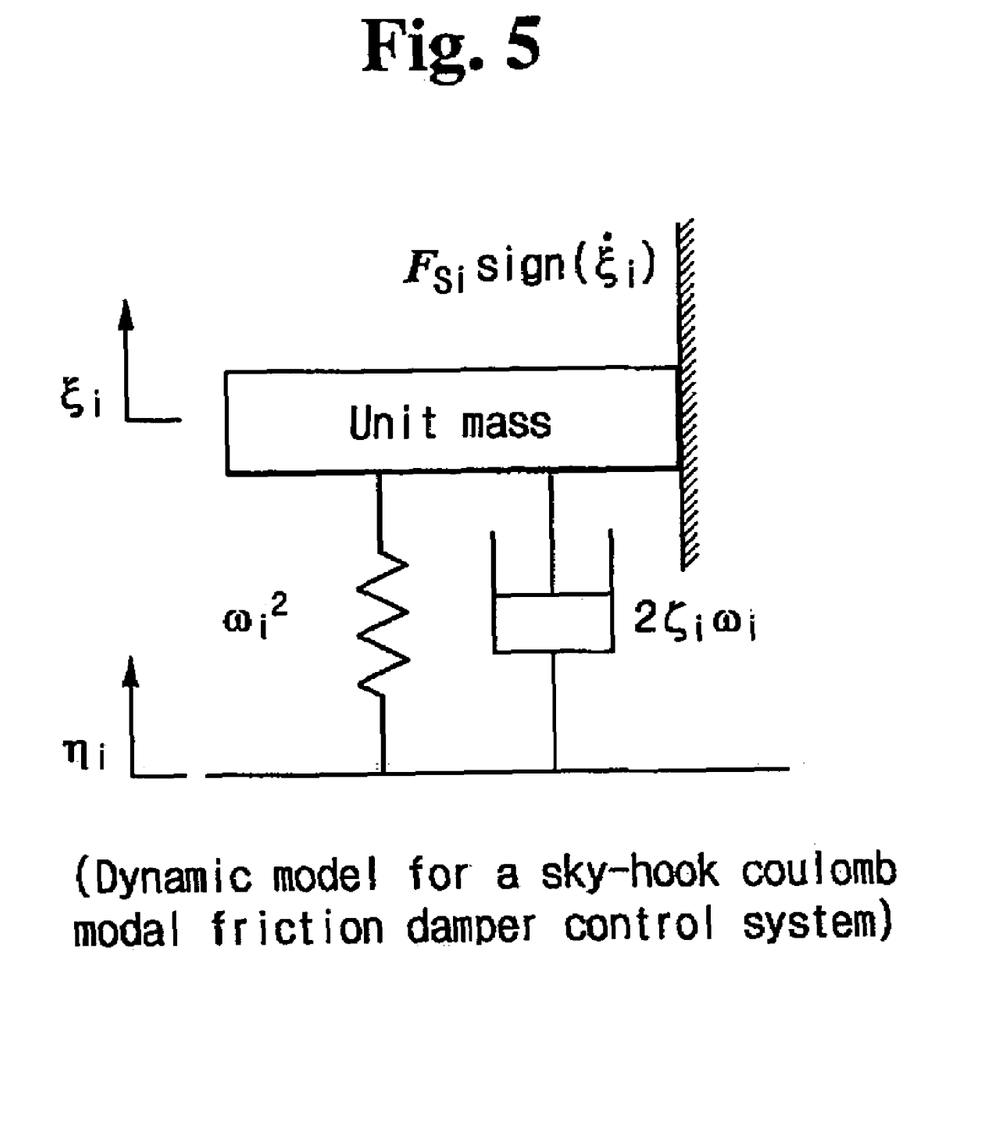
FIG. 5 illustrates an exemplary dynamic model for a vehicle suspension system including a sky-hook coulomb modal friction damper that satisfies non-coupled modal equations according to an embodiment of the present invention.

In this case, a sky-hook coulomb modal friction damper is preferably adopted as a damper for active damping. An exemplary dynamic model for a vehicle suspension system including a sky-hook coulomb modal friction damper that satisfies non-coupled modal equations is illustrated in FIG. 5.

When the number p of the actuators 160 is less than the number n of the modes, the equation of motion of the suspension system can not be entirely decoupled including its right side (i.e., actuating force side).

In this case, when an actuating force proportional to a mode velocity is applied to the actuators 160 in order to increase a value of a diagonal element of the modal damping matrix $\hat{C}$, values of its non-diagonal elements are also increased. That is, damping effect cannot be independently increased with respect to a specific mode, and an increase of damping for a specific mode may cause a negative effect (i.e., increase of vibration energy) on damping in a different mode.

Therefore in such a case in which the number p of the actuators 160 is less than the number n of the modes, a sky-hook coulomb modal friction damper is adopted as a damper for an active damping such that a negative effect on different modes when damping of a specific mode is controlled to increase.

In the case of a sky-hook coulomb modal friction damper, the modal control force $\hat{f}$ satisfies the following equation (12).

$$\hat{f}_i = -F_{Si}\text{sign}(\dot{\xi}_i) = \sum_{j=1}^{p} Q_{ij} f_j \qquad (12)$$

Here, $F_{Si}$ denotes a frictional force of a sky-hook coulomb friction damper connected to an i-th mode. As was previously described, p denotes the number of the actuators, and the matrix Q is defined as $Q=S^T P$. $\dot{\xi}_i$ means an absolute velocity of an i-th mode, and $\text{sign}(\dot{\xi}_i)$ denotes a sign thereof.

In order to satisfy the above equation (12), a j-th actuating force $f_j$ (j=1, ... ,p) is calculated as the following equation (13):

$$\begin{cases} \text{if} Q_{1j}\text{sign}(\dot{\xi}_1) \geq & \cdots & Q_{nj}\text{sign}(\dot{\xi}_n) \geq 0, & f_j = -F_A \\ 0\ \&\ Q_{2j}\text{sign}(\dot{\xi}_2) \geq 0\ \& & & \\ \text{if} Q_{1j}\text{sign}(\dot{\xi}_1) \geq & \cdots & Q_{nj}\text{sign}(\dot{\xi}_n) < 0, & f_j = -F_1 \\ 0\ \&\ Q_{2j}\text{sign}(\dot{\xi}_2) \geq 0\ \& & & \\ & \vdots & \vdots & \\ \text{if} Q_{1j}\text{sign}(\dot{\xi}_1) < & \cdots & Q_{nj}\text{sign}(\dot{\xi}_n) \geq 0, & f_j = -F_{(2^n-2)} \\ 0\ \&\ Q_{2j}\text{sign}(\dot{\xi}_2) < 0\ \& & & \\ \text{if} Q_{1j}\text{sign}(\dot{\xi}_1) < & \cdots & Q_{nj}\text{sign}(\dot{\xi}_n) < 0, & f_j = -F_B \\ 0\ \&\ Q_{2j}\text{sign}(\dot{\xi}_2) < 0\ \& & & \end{cases} \qquad (13)$$

Here, $F_P$ and $F_N$ respectively denote a positive maximum force and a negative maximum force that a j-th actuator can generate. $F_k$ for k=1, ... ,($2^n=2$) is a value between $F_P$ and $F_N$.

According to the above equation (13), when $F_k$ is not zero (0) for k=1, ... ,($2^n-2$), motion of the vehicle body 100 is reduced for several modes and increased for several other modes. For example, in order to reduce motion of the first mode, $F_1$ should have a positive value, but in this case, the motion increases in an n-th mode. Therefore, according to a second embodiment, values $F_k$ for all k=1, ... ,($2^n-2$) are set to zero (0) such that motions in each mode can be independently reduced.

In summary, the controller 150 calculates the j-th actuating force $f_j$ (j=1, ... ,p) as the following equation (14):

$$\begin{cases} \text{if } Q_{ij}\text{sign}(\dot{\xi}_i) \geq 0 & \text{for } i=1, \ldots, n, & f_j = -F_P \\ \text{if } Q_{ij}\text{sign}(\dot{\xi}_i) < 0 & \text{for } i=1, \ldots, n, & f_j = -F_N \\ \text{Otherwise}, & & f_j = 0 \end{cases} \qquad (14)$$

According to the above equation (14), the actuators 160 are activated only in the case in which vibration energy can be dissipated in every mode.

For example, when only two actuators are mounted to a vehicle suspension system that has more than two degrees of freedom, only a first actuator is activated with an actuating force if the first actuator dissipates vibration energy in every mode but a second actuator does not. In other words, a j-th actuator is operated only when the operation ensures dissipation of vibration energy in every mode.

A first line of equation (14) (or a first line of equation (13)) implies that, in the case in which the j-th actuator can dissipate vibration energy in every mode, the j-th actuator is operated to the positive maximum force. That is, in this case application of a positive actuating force to the j-th actuator dampens vibration. So, such vibration damping effect is controlled to be maximized by applying the positive maximum actuating force to the j-th actuator.

In addition, a second line of equation (14) (or a last line of equation (13)) implies a case in which a positive value of an actuating force of the j-th actuator causes an increase of vibration energy in every mode. So, in this case, the j-th actuator is controlled to a negative maximum actuating force. That is, since application of a positive actuating force to the j-th actuator increases vibration, such vibration can be dampened by applying negative actuating force. So, in this case, vibration damping effect is controlled to be maximized by applying the negative maximum actuating force to the j-th actuator.

Lines between the first and last lines of equation (13) relate to cases in which operation of the j-th actuator causes an increase of vibration for several modes and a decrease of vibration for several other modes. A person of ordinary skill in the art may choose appropriate values of $F_k$ to comply with a desired characteristic of a specific suspension system within the prescribed ranges.

According to the second embodiment, the values of $F_k$ are preset to zero (0) such that any negative effect (increase of vibration energy in any mode) may not occur.

The controller 150 can apply the actuating force of equation (14) to the actuators 160 in the process described hereinafter.

Figure 6:
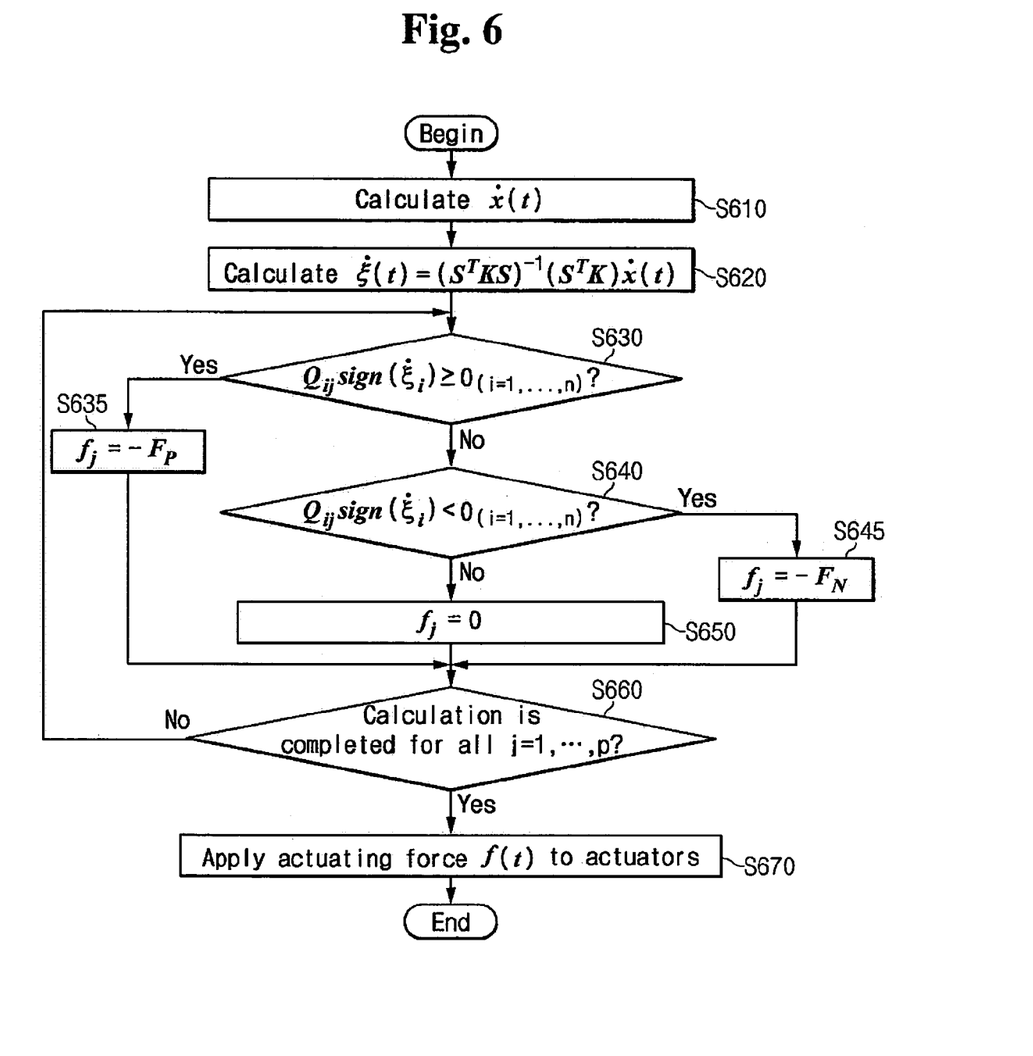
FIG. 6 is a flowchart showing a method for controlling a vehicle suspension system, performed by a controller when a number n of degrees of freedom of equations of motion of the suspension system is greater than a number p of actuators, according to an embodiment of the present invention.

As shown in FIG. 6, firstly at step S610, the controller 150 calculates the time derivative (i.e., velocity) $\dot{x}(t)$ of the state vector $x(t)$ on the basis of signals from the sensor unit 110.

Subsequently at step S620, the controller 150 calculates a velocity $\dot{\xi}(t)$ of a modal state vector $\xi(t)$ on the basis of the velocity $\dot{x}(t)$ of the state vector $x(t)$. The velocity $\dot{\xi}(t)$ of the modal state vector $\xi(t)$ is calculated by $x(t)=S\xi(t)$ using the similarity transform matrix S and the stiffness matrix K, which is predetermined at a stage of designing the suspension system. In more detail, the velocity $\dot{\xi}(t)$ of the modal state vector $\xi(t)$ is calculated as a value according to $\dot{\xi}(t)=(S^T KS)^{-1}(S^T K)\dot{x}(t)$.

Subsequently at steps S630–S640, the controller 150 calculates the j-th component $f_j$ (i.e., an actuating force of a j-th actuator) of the actuating force vector f(t) for each j (j=1, . . . ,p), using the velocity $\dot{\xi}(t)$ of the modal state vector $\xi(t)$.

In order to calculate the actuating force $f_j$ for the j-th actuator, the controller 150 firstly determines if $Q_{ij}\text{sign}(\dot{\xi}_i)\geq 0$ is satisfied for every i-th mode (i=1, . . . ,n) at step S630.

When $Q_{ij}\text{sign}(\dot{\xi}_i)\geq 0$ is satisfied for every i-th mode (i=1, . . . ,n) (S630-yes), the controller 150 sets the actuating force $f_j$ for the j-th actuator as $-F_P$ at step S635.

In addition, the controller 150 further determines if $Q_{ij}\text{sign}(\dot{\xi}_i)<0$ is satisfied for every i-th mode (i=1, . . . ,n) at step S640.

When $Q_{ij}\text{sign}(\dot{\xi}_i)<0$ is satisfied for every i-th mode (i=1, . . . ,n) (S640-yes), the controller 150 sets the actuating force $f_j$ for the j-th actuator as $-F_N$ at step S645.

When neither of $Q_{ij}\text{sign}(\dot{\xi}_i)\geq 0$ and $Q_{ij}\text{sign}(\dot{\xi}_i)<0$ is fully satisfied for all i-th modes (i=1, . . . ,n) (S630-no and S640-no), the controller 150 sets the actuating force $f_j$ zero (0) at step S650.

By recursive execution of the steps S630–S650 according to step S660, the controller 150 calculates the actuating force $f_j$ for the j-th actuator (j=1, . . . ,p).

When the actuating force $f_j$ has been calculated for every j=1, . . . ,p, the calculation of the actuating force vector f(t) is completed.

Then at step S670, the controller 150 activates the actuators 160 by the calculated actuating force vector f(t).

Regarding the above description, the following remarks are noteworthy.

Firstly, it is not necessarily required that the sensor unit 110 detects the state vector x(t) and that the controller 150 calculates its velocity $\dot{x}(t)$. As a modified embodiment, the sensor unit 110 may directly detect the velocity $\dot{x}(t)$ of the state vector x(t) such that the controller 150 can simply receive the detected velocity $\dot{x}(t)$. Therefore, in the detailed description of the embodiment of the present invention and in the appended claims, the calculation of the velocity $\dot{x}(t)$ of the state vector x(t) should be understood to cover any step for obtaining the value of the velocity $\dot{x}(t)$ of the state vector $\dot{x}(t)$.

According to an embodiment of the present invention, an actively controlled suspension system can be more easily designed for its active control.

When as many actuators are provided as there are degrees of freedom of the suspension system, each vibration mode can be efficiently and independently controlled.

In addition, vibration modes can be controlled without causing negative effects to other vibration modes even when the number of actuators falls short of the number of degrees of freedom of the suspension system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a vehicle suspension system, the vehicle suspension including a plurality of dampers and a plurality of actuators, the vehicle suspension system being represented by an equation (1) and being transformed to a decoupled equation (2), the method comprising:
calculating a velocity vector $\dot{x}(t)$ of a state vector x(t) of the equation 1;
calculating an actuating force f(t) such that the actuating force f(t) satisfies $$\begin{cases} \text{if } Q_{1j}\text{sign}(\dot{\xi}_1) \geq & \cdots & Q_{nj}\text{sign}(\dot{\xi}_n) \geq 0, & f_j = -F_A \\ 0 \, \& Q_{2j}\text{sign}(\dot{\xi}_2) \geq 0 \, \& & & \\ \text{if } Q_{1j}\text{sign}(\dot{\xi}_1) \geq & \cdots & Q_{nj}\text{sign}(\dot{\xi}_n) < 0, & f_j = -F_1 \\ 0 \, \& Q_{2j}\text{sign}(\dot{\xi}_2) \geq 0 \, \& & & \\ \vdots & & \vdots \\ \text{if } Q_{1j}\text{sign}(\dot{\xi}_1) < & \cdots & Q_{nj}\text{sign}(\dot{\xi}_n) \geq 0, & f_j = -F_{(2^n-2)} \\ 0 \, \& Q_{2j}\text{sign}(\dot{\xi}_2) < 0 \, \& & & \\ \text{if } Q_{1j}\text{sign}(\dot{\xi}_1) < & \cdots & Q_{nj}\text{sign}(\dot{\xi}_n) < 0, & f_j = -F_B \\ 0 \, \& Q_{2j}\text{sign}(\dot{\xi}_2) < 0 \, \& & & \end{cases}$$

with respect to i=1, . . . , n and j=1, . . . , p; and
actuating the actuators by the calculated actuating force f(t), wherein:
$F_A$ is a value in a range of zero (0) to $F_P$;
$F_B$ is a value in a range of zero (0) to $F_N$;

$F_k$ for k=1, ..., ($2^n$−2) is a value between $F_P$ and $F_N$;

$F_P$ and $F_N$ respectively denote a positive maximum force and a negative maximum force that a $j^{th}$ actuator can generate;

the equation (1) is $$M\ddot{x}(t)+C(\dot{x}(t)-\dot{u}(t))+K(x(t)-u(t))=Pf(t); \text{ and}$$

the equation (2) is $$I\ddot{\xi}(t)+\text{diag}[2\zeta_i\omega_i](\dot{\xi}(t)-\dot{\eta}(t))+\Lambda_K(\xi(t)-\eta(t))=\hat{f}(t)$$

wherein:

n and p respectively denote the number of degrees of freedom of the suspension system and the number of independent actuators;

M, C, and K respectively denote a mass matrix, a damping matrix, and a stiffness matrix, each of which is symmetrically n×n, the mass matrix M being a positive definite matrix, the damping matrix C being a positive semi-definite matrix, and the stiffness matrix K being a positive definite matrix;

P denotes an n×p real matrix corresponding to positions of the actuators, x(t) and u(t) respectively denote n×1 state and disturbance vectors;

f(t) denotes a p×1 external force vector;

I is an n×n unit matrix;

S is a matrix consisting of eigenvectors of the stiffness matrix K and is normalized with respect to the mass matrix M; and $Q=S^TP$, $\hat{f}=Qf(t)$, $x(t)=S\xi(t)$, $u(t)=S\eta(t)$, $S^TKS=\text{diag}[\omega_i^2]=\Lambda_K$, and $S^TCS=\hat{C}=\text{diag}[2\zeta_i\omega_i]$ are satisfied by the matrix S.

2. The method of claim 1, wherein the actuating force f(t) satisfies $$\begin{cases} \text{if} Q_{1j}\text{sign}(\dot{\xi}_1) \geq 0 \text{ for } i=1,\ldots,n, & f_i=-F_A \\ \text{if} Q_{1j}\text{sign}(\dot{\xi}_1) < 0 \text{ for } i=1,\ldots,n, & f_i=-F_B \\ \text{Otherwise,} & f_j=0 \end{cases}$$

with respect to i=1, ..., n and j=1, ..., p.

3. A vehicle suspension system comprising:

a plurality of springs;

a plurality of dampers, each corresponding to one of the springs; and a plurality p of actuators for generating control force applied to the suspension system, wherein:

the suspension system is represented by an equation (1); and the equation (1) is decoupled into n modal equations, wherein the equation (1) is a linear matrix equation having a plurality n of degrees of freedom, and the linear matrix equation includes a damping matrix for a viscous damping, wherein the equation (1) is $$M\ddot{x}(t)+C(\dot{x}(t)-\dot{u}(t))+K(x(t)-u(t))=Pf(t)$$

wherein:

n and p respectively denote the number of degrees of freedom of the suspension system and the number of independent actuators;

M, C, and K respectively denote a mass matrix, a damping matrix, and a stiffness matrix, each of which is symmetrically n×n, the mass matrix M being a positive definite matrix, the damping matrix C being a positive semi-definite matrix, and the stiffness matrix K being a positive definite matrix;

P denotes an n×p real matrix corresponding to positions of the actuators, x(t) and u(t) respectively denote n×1 state and disturbance vectors; and f(t) comprises the control force applied to the suspension system, denoted as a p×1 external force vector.

4. The vehicle suspension system of claim 3, wherein a proportional relationship $k_j=\alpha \times c_j$ is satisfied between each pair of a spring coefficient $k_j$ of a $j^{th}$ spring and a damping coefficient $c_j$ of a $j^{th}$ damper corresponding to the $j^{th}$ spring; wherein α is a constant.

5. The vehicle suspension system of claim 4, wherein the number n and the number p are equal, the suspension system further comprising:

a detecting unit for detecting at least one of the state vector x(t) and its velocity $\dot{x}(t)$; and a controller for controlling the actuators on the basis of the detected one of the state vector x(t) or its velocity $\dot{x}(t)$, wherein the controller controls the actuators by an actuating force of $f=Q^{-1}\hat{f}$, wherein:

$Q=S^TP$, $\hat{f}_i=-C_{Si}\dot{\xi}_i$, and $x(t)=S\xi(t)$ are satisfied;

$C_{Si}$ is a damping coefficient of a sky-hook damper connected to an $i^{th}$ mode; and S is a matrix consisting of eigenvectors of the stiffness matrix K and is normalized with respect to the mass matrix M.

6. The vehicle suspension system of claim 4, wherein the number p is less than the number n, the suspension system further comprising:

a detecting unit for detecting at least one of the state vector x(t) and its velocity $\dot{x}(t)$; and a controller for controlling the actuators on the basis of the detected one of the state vector x(t) or its velocity $\dot{x}(t)$, wherein the controller controls the actuators by an actuating force of $$\hat{f}_i = -F_{Si}\text{sign}(\dot{\xi}_i) = \sum_{j=1}^{p} Q_{ij}f_j,$$

f(t) that satisfies wherein:

$Q=S^TP$ and $x(t)=S\xi(t)$ are satisfied;

$F_{Si}$ is a frictional force of a sky-hook coulomb friction damper connected to an $i^{th}$ mode; and S is a matrix consisting of eigenvectors of the stiffness matrix K and is normalized with respect to the mass matrix M.

7. The vehicle suspension system of claim 6, wherein the actuating force f(t) satisfies $$\begin{cases} \text{if} Q_{1j}\text{sign}(\dot{\xi}_1) \geq & \cdots & Q_{nj}\text{sign}(\dot{\xi}_n) \geq 0, & f_j=-F_A \\ 0\ \&Q_{2j}\text{sign}(\dot{\xi}_2) \geq 0\ \& & & & \\ \text{if} Q_{1j}\text{sign}(\dot{\xi}_1) \geq & \cdots & Q_{nj}\text{sign}(\dot{\xi}_n) < 0, & f_j=-F_1 \\ 0\ \&Q_{2j}\text{sign}(\dot{\xi}_2) \geq 0\ \& & & & \\ & & \vdots & \\ \text{if} Q_{1j}\text{sign}(\dot{\xi}_1) < & \cdots & Q_{nj}\text{sign}(\dot{\xi}_n) \geq 0, & f_j=-F_{(2^n-2)} \end{cases}$$

-continued $$\begin{cases} 0 \ \& Q_{2j}\text{sign}(\dot{\xi}_2) < 0 \ \& \\ \text{if} Q_{1j}\text{sign}(\dot{\xi}_1) < \quad \cdots \quad Q_{nj}\text{sign}(\dot{\xi}_n) < 0, \quad f_j = -F_B \\ 0 \ \& Q_{2j}\text{sign}(\dot{\xi}_2) < 0 \ \& \end{cases}$$

with respect to i=1, . . . , n and j=1, . . . , p,
wherein:
$F_A$ is a value in a range of zero(0) to $F_P$;
$F_B$ is a value in a range of zero(0) to $F_N$;
$F_k$ for k=1, . . . , $(2^n-2)$ is a value between $F_P$ and $F_N$; and
$F_P$ and $F_N$ respectively denote a positive maximum force and a negative maximum force that a $j^{th}$ actuator can generate.

8. The vehicle suspension system of claim 7, wherein the actuating force f(t) satisfies $$\begin{cases} \text{if} Q_{1j}\text{sign}(\dot{\xi}_1) \geq 0 \text{ for } i = 1, \ldots, n, \quad f_i = -F_A \\ \text{if} Q_{1j}\text{sign}(\dot{\xi}_1) < 0 \text{ for } i = 1, \ldots, n, \quad f_i = -F_B \\ \text{Otherwise,} \quad\quad\quad\quad\quad\quad\quad\quad\quad f_j = 0 \end{cases}$$

with respect to i=1, . . . , n and j=1, . . . , p.

9. The vehicle suspension system of claim 8, wherein values of $F_A$ and $F_P$ are equal, and values of $F_B$ and $F_N$ are equal.

10. A method for controlling a vehicle suspension system, the vehicle suspension including a plurality of dampers and a plurality of actuators, the vehicle suspension system being represented by an equation (1) and being transformed to a decoupled equation (2), the method comprising:
  calculating a velocity vector $\dot{x}(t)$ of a state vector x(t) of equation (1);
  calculating an actuating force f(t) such that the actuating force f(t) satisfies $f(t)=(S^TP)^{-1}(-C_{Si})(S^TKS)^{-1}(S^TK)$ $\dot{x}(t)$, the $C_{Si}$ being a damping coefficient of a sky-hook damper connected to an $i^{th}$ mode; and
  actuating the actuators by the calculated actuating force f(t),
wherein:
the equation (1) is $$M\ddot{x}(t)+C(\dot{x}(t)-\dot{u}(t))+K(x(t)-u(t))=Pf(t), \text{ and}$$

the equation (2) is $$I\ddot{\xi}(t)+\text{diag}[2\zeta_i\omega_i](\dot{\xi}(t)-\dot{\eta}(t))+\Lambda_K(\xi(t)-\eta(t))=\tilde{f}(t)$$

wherein:
n and p respectively denote the number of degrees of freedom of the suspension system and the number of independent actuators;
M, C, and K respectively denote a mass matrix, a damping matrix, and a stiffness matrix, each of which is symmetrically n×n, the mass matrix M being a positive definite matrix, the damping matrix C being a positive semi-definite matrix, and the stiffness matrix K being a positive definite matrix;
P denotes an n×p real matrix corresponding to positions of the actuators,
x(t) and u(t) respectively denote n×1 state and disturbance vectors;
f(t) denotes a p×1 external force vector;
I is an n×n unit matrix;
S is a matrix consisting of eigenvectors of the stiffness matrix K and is normalized with respect to the mass matrix M; and
$Q=S^TP$, $\tilde{f}=Qf(t)$, $x(t)=S\xi(t)$, $u(t)=S\eta(t)$, $S^TKS=\text{diag}[\omega_i^2]=\Lambda_K$, and $S^TCS=\tilde{C}=\text{diag}[2\zeta_i\omega_i]$ are satisfied by the matrix S.

11. The method of claim 2, wherein values of $F_A$ and $F_P$ are equal, and values of $F_A$ and $F_N$ are equal.

* * * * *